(12) United States Patent
Jensen et al.

(10) Patent No.: US 8,470,282 B2
(45) Date of Patent: Jun. 25, 2013

(54) PRODUCTION OF CALCIUM CARBONATE

(75) Inventors: Christoph Jensen, Leuna (DE); Ilka Markwardt, Halle (DE)

(73) Assignee: CalciTech Synthetic Minerals Ltd., Geneva (CH)

( * ) Notice: Subject to any disclaimer, the term of this patent is extended or adjusted under 35 U.S.C. 154(b) by 0 days.

(21) Appl. No.: 13/437,212

(22) Filed: Apr. 2, 2012

(65) Prior Publication Data

US 2012/0189515 A1 Jul. 26, 2012

Related U.S. Application Data

(63) Continuation of application No. PCT/EP2010/006036, filed on Oct. 4, 2010.

(30) Foreign Application Priority Data

Oct. 2, 2009 (GB) .................................. 0917248.7

(51) Int. Cl.
- *C01F 11/18* (2006.01)
- *C01F 11/02* (2006.01)
- *B01D 53/62* (2006.01)
- *C07C 31/18* (2006.01)

(52) U.S. Cl.
USPC ........... 423/432; 423/220; 423/225; 423/230; 423/430; 423/635; 423/636; 423/640; 568/852

(58) Field of Classification Search
USPC .............. 423/220, 225, 230, 430, 432, 441, 423/635, 636, 640; 568/852
See application file for complete search history.

(56) References Cited

U.S. PATENT DOCUMENTS

| | | |
|---|---|---|
| 3,340,003 A | 9/1967 | Judd |
| 3,443,890 A | 5/1969 | Sisson et al. |
| 3,669,620 A | 6/1972 | Bennett et al. |

(Continued)

FOREIGN PATENT DOCUMENTS

| | | |
|---|---|---|
| BE | 1003269 A3 | 2/1992 |
| DE | 19 04 299 A1 | 9/1970 |

(Continued)

OTHER PUBLICATIONS

Filipescu, Preparation of pure calcium carbonate, XP002026052, Chemical Abstracts, Chemical Pan 107-117846Z, (Abstract published Oct. 5, 1987).

(Continued)

*Primary Examiner* — Daniel C McCracken
*Assistant Examiner* — Daniel Berns
(74) *Attorney, Agent, or Firm* — Woodard, Emhardt, Moriarty, McNett & Henry LLP

(57) ABSTRACT

A method of producing calcium carbonate from lime comprises the steps of: (i) providing an aqueous solution comprising 10% to 35% by weight of dissolved polyhydroxy compound and 1% to 5% by weight of dissolved calcium hydroxide (expressed as $Ca(OH)_2$) and having a pH of at least 11.5; (ii) treating the solution prepared in step (i) to remove solids including suspended solids; (iii) dispersing carbon dioxide through the solution so as to form calcium carbonate with a consequential reduction in the pH of the reaction mixture, (iv) during a time period beginning at the start of a sudden, short rise in pH and ended during a subsequent fall in pH but before it reaches 9.5 terminating the dispersion of carbon dioxide and adding an alkaline reagent to maintain a pH for the product mixture of at least 9.5, and (v) recovering precipitated calcium carbonate.

24 Claims, 4 Drawing Sheets

U.S. PATENT DOCUMENTS

| | | | |
|---|---|---|---|
| 4,237,147 | A | 12/1980 | Merten et al. |
| 4,760,138 | A | 7/1988 | So et al. |
| 5,120,521 | A | 6/1992 | Ebinuma et al. |
| 5,332,564 | A | 7/1994 | Chapnerkar et al. |
| 5,558,850 | A | 9/1996 | Bleakley et al. |
| 5,846,500 | A | 12/1998 | Bunger et al. |
| 6,063,237 | A | 5/2000 | Adams et al. |

FOREIGN PATENT DOCUMENTS

| | | |
|---|---|---|
| EP | 0 286 564 A1 | 10/1988 |
| EP | 0 468 719 A1 | 1/1992 |
| GB | 1 222 471 | 2/1971 |
| JP | 48-55198 | 11/1971 |
| JP | 48-55198 A | 11/1971 |
| JP | 53-054200 A | 5/1978 |
| JP | S3-54200 | 5/1978 |
| JP | 62202817 A | 2/1986 |
| JP | 4139020 A | 1/1990 |
| WO | WO 00/34182 | 6/2000 |
| WO | WO 2006/005793 A1 | 1/2006 |

OTHER PUBLICATIONS

GB0917248.7 Intellectual Property Office Search Report dated Mar. 1, 2010.

GB0921820.7 Intellectual Property Office Search Report dated Nov. 11, 2010.

Patt, R., et al, Paper and Pulp; 1. Pulp, in: Ullmann's Encyclopedia of Industrial Chemistry (Jun. 15, 2000), pp. 33-40 [Retrieved May 4, 2001], DOI: 10.1002/14356007. . . a18_545.

PCT/EP2010/006036 International Preliminary Examination Report dated Apr. 3, 2012.

PCT/GB2010/002267 International Search Report dated May 5, 2011.

Van Balen, Carbonation reaction of lime, kinetics at ambient temperature, Cement and Concrete Research, Pergamon Press, Elmsford, NY, vol. 35, No. 4, Apr. 1, 2005, pp. 647-657.

PRODUCTION OF CALCIUM CARBONATE

CROSS-REFERENCE TO RELATED APPLICATIONS

This application is a continuation of International Application No. PCT/EP2010/006036 filed Oct. 4, 2010, which claims the foreign priority benefit of GB 0917248.7 filed Oct. 2, 2009, which is hereby incorporated by reference.

BACKGROUND

The present invention relates to a method of producing calcium carbonate from lime which is used to produce a solution of calcium ions to which carbon dioxide is added to precipitate calcium carbonate.

Calcium carbonate has a wide variety of uses. For example, it is used extensively as a functional filler in materials such as paints, paper, coatings, plastics, sealants and inks. Other applications of calcium carbonate are in the food, cosmetics and pharmaceutical industries.

Calcium carbonate is a naturally occurring mineral which after grinding is used for a number of applications. That said, the morphology, the particle size, and particle size distribution of the ground product as well as its purity are not adequate for certain applications nor optimum for others.

Calcium carbonate may also be obtained by a "chemical route" in which carbon dioxide is added to a solution of calcium ions, resulting in precipitation of calcium carbonate. The starting material for such a process is typically lime (CaO) or lime hydroxide (Ca(OH)$_2$). The "classic" process uses CaO as the starting material. Initially this lime is slaked with water to produce an aqueous suspension of lime hydroxide ("slaked lime"):

$$CaO + H_2O = Ca(OH)_2$$

to which carbon dioxide is added to produce calcium carbonate in accordance with the following equation:

$$Ca(OH)_2 + CO_2 = CaCO_3 + H_2O$$

There is however a disadvantage associated with the "classic" process in that the Ca(OH)$_2$ has very limited solubility in water so the overall process is relatively slow.

In a development of the above process a solution of calcium ions is prepared by dissolving the lime or lime hydroxide in an aqueous solution incorporating a polyhydroxy compound which serves to facilitate dissolution of calcium ions. As a result, the carbonation process is faster. Various polyhydroxy compounds may be used for this purpose. For example, WO-A-0034182 (Kemgas Ltd) discloses the use of polyhydroxy compounds of formula HOCH$_2$(CHOH)$_n$CH$_2$OH in which n is 1 to 6 with the preferred example being sorbitol. Other polyhydroxy compounds that may be used to facilitate the solution of the lime or lime hydroxide (to produce a calcium ion solution to which carbon dioxide is added to precipitate carbon dioxide) include sucrose.

The production of calcium carbonate using the process described in WO-A-0034182 has a particular advantage in that the lime or lime hydroxide may be a waste, by-product from another chemical process, so that its conversion to calcium carbonate allows a useful material to be generated from what would otherwise be waste. Thus, for example, the waste lime may be carbide lime which is a by-product in the production of acetylene by the reaction of calcium carbide and water according to the equation $$CaC_2 + 2H_2O \rightarrow Ca(OH)_2 + C_2H_2$$

Carbide lime is also known as carbide sludge, generator slurry, lime sludge, lime hydrate, and hydrated carbide lime. It is a grey-black substance typically consisting of around 90% by weight of calcium hydroxide (based upon the solids content of the carbide lime), the remainder being impurities which depend upon the method used to manufacture the acetylene and also upon the source of the materials used to manufacture the calcium carbide (normally made by roasting calcium oxide and coal). The main impurities are the oxides of silicon, iron, aluminum, magnesium and manganese combined with carbon, ferrosilicon and calcium sulphate. Additionally if the carbide lime is stored outside, calcium carbonate, formed by the reaction of calcium hydroxide with carbon dioxide, may be present as an impurity. The conversion of carbide lime to calcium carbonate is described in WO-A-0034182 (Kemgas Ltd).

The carbon dioxide required for the precipitation of calcium carbonate from the solution of calcium ions may also be a waste material whose discharge needs to be controlled for environmental reasons (it is a well-known "greenhouse gas") so it may be effectively captured by conversion to calcium carbonate.

The production of calcium carbonate from waste lime or lime hydroxide and carbon dioxide therefore represents an environmentally attractive process.

There are several disadvantages associated with the production of calcium carbonate by the carbonation of a solution of calcium ions obtained from lime or its hydroxide using the "classic" process. These are described below with specific reference to lime although it will appreciated that the same disadvantages apply to the use of lime hydroxide as starting material.

Firstly, the calcium carbonate produced from lime may incorporate unacceptably high levels of impurities derived from the latter. There are at least two sources of such impurities in the lime. One source is "naturally occurring" in that the lime will itself (usually) be derived from a mineral source of calcium carbonate (e.g. limestone, dolomite etc) and such minerals will include impurities which remain in the lime. A further (possible) source of impurities in the lime applies particularly in the case of lime hydroxide and arises from a chemical reaction by which the lime hydroxide has been produced (e.g carbide lime may incorporate impurities from carbon used in the production of calcium carbide). Whatever the source, examples of impurities present in a calcium carbonate product obtained by carbonation of a solution of calcium ions derived from lime or lime hydroxide may include aluminum, arsenic, lead, iron, mercury, chromium, nickel, copper and/or zinc. Some of these impurities render calcium carbonate unsuitable for certain applications (e.g. food and pharmaceutical uses) due to toxicity issues. Other impurities (e.g. iron) whilst not necessarily being toxic may affect properties such as the "whiteness" of the calcium carbonate so that it may not be suitable, for example, for use as a coating in high quality papers.

Secondly calcium carbonate produced by the classic process involving addition of carbon dioxide to a suspension of slaked lime may have irregular particle sizes and shapes and the particles may form agglomerates rather than remaining as discrete particles. Irregular particle sizes cause problems in applications such as polymers, sealants, decorative paints, industrial coatings, inks and paper coating.

Thirdly for certain applications the conventional process, due to the irregular particle sizes, requires subsequent milling of the product. Milling is energy intensive and always creates a certain amount of fine particles which can be detrimental and are difficult to remove.

It is therefore an object of the present invention to obviate or mitigate the above mentioned disadvantages.

According to the present invention there is provided a method of producing calcium carbonate from lime comprising the steps of:

(i) providing an aqueous solution comprising 10% to 35% by weight of dissolved polyhydroxy compound and 1% to 5% by weight of dissolved calcium hydroxide (expressed as $Ca(OH)_2$) and having a pH of at least 11.5;
(ii) treating the solution prepared in step (i) to remove solids including suspended solids;
(iii) dispersing carbon dioxide through the solution so as to form calcium carbonate with a consequential reduction in the pH of the reaction mixture;
(iv) during a time period beginning at the start of a sudden, short rise in pH and ended during a subsequent fall in pH but before the pH reaches 9.5 terminating the dispersion of carbon dioxide and adding an alkaline reagent to maintain a pH for the product mixture of at least 9.5; and
(v) recovering precipitated calcium carbonate.

We have established that the carbonation reaction involving a dispersion of carbon dioxide through an aqueous solution of lime dissolved with the aid of a polyhydroxy compound proceeds in a number of phases.

In the first phase ("phase 1") viscosity remains stable, carbon dioxide can be absorbed at a relatively high rate, and there is a gradual fall in pH. After a particular time depending on reaction conditions, there is a transition from the from the first phase to a second phase ("phase 2") in which the maximum rate at which carbon dioxide can be absorbed by the reaction mixture is lower than in phase 1 of the process. The transition from phase 1 to phase 2 may be detected by an increase in the amount of carbon dioxide passing out of the reactor in which the carbonation reaction is being effected (assuming that the carbon dioxide is supplied to the reactor at the same rate as in phase 1). Depending on reaction conditions, there may be a viscosity increase in going from phase 1 to phase 2 and a gel may be visible for the duration of the latter. The pH continues to fall gradually during phase 2, although generally will remain above 10.

Surprisingly, there is a sudden, short rise in pH followed by a decline which if left uncontrolled results in the pH of the product mixture continuing to fall. We identify the beginning of this short, sharp rise in pH as the commencement of a third phase ("phase 3") for the reaction. During phase 3 calcium carbonate particles precipitate out and there is generally an increase in opacity caused by precipitated calcium carbonate particles. The increase in opacity is notable by a visible brightening of the reaction mixture with break-up of any gel.

Based on our studies of the reaction (as detailed above) we have established that calcium carbonate of high purity and small, uniform particle size may be produced by control of the reaction in phase 3 by:
(a) terminating dispersion of carbon dioxide into the reaction mixture after the beginning of phase 3 (manifested by the short, sharp rise in pH) but before pH drops below 9.5; and
(b) ensuring that the pH of the product mixture is maintained at a value of at least 9.5 by the addition of an alkaline reagent.

By adopting these two control features we have established that calcium carbonate of small uniform particle size and high purity is produced.

In a preferred embodiment of the method of the invention, the rate at which carbon dioxide is dispersed in the reaction mixture during phase 1 of the method is the maximum rate at which the carbon dioxide can be absorbed so that little or no carbon dioxide is evolved from the reaction mixture. This minimises the time required for completion of phase 1 which improves the productivity of the process.

Similarly phase 2 is also preferably effected using a rate of carbon dioxide dispersion which is the maximum that can be absorbed by the reaction mixture. It will however generally be found that the rate (for phase 2) is lower than for phase 1.

Preferably addition of carbon dioxide is terminated after the beginning of the sudden short pH rise and prior to addition of the alkaline reagent. This ensures that the carbon dioxide does not contribute to a pH reduction after addition of the alkaline reagent.

Calcium carbonate produced by the method of the invention has a very narrow particle size distribution. This can be expressed by the ratio $d_{90}/d_0$ where $d_{90}$ is the size below which 90% of particles fall and $di_0$ is the size below which 10% of particles fall. This ratio is typically below 4.0. Typically the method of the invention allows calcium carbonate to be produced with mean particle sizes from 0.3 to 3.0 microns. A typical example of particles produced in accordance with the method of the invention have a size of about 0.9 microns with a particle size distribution giving a $d_{90}$ of about 1.3 microns and a $d_0$ of about 0.5 microns so that the ratio $d_{90}/d_{10}$ is 2.6. Particle sizes have been measured with a Beckman Coulter laser diffraction particle size analyzer.

When seen under high magnification, particles of calcium carbonate obtained in accordance with the invention have the appearance of "rice grains" in that they are elongate with rounded ends. The aspect ratio (length divided by diameter) is between 1.5 and 5.0, and is typically 3.0.

Calcium carbonate produced in accordance with preferred embodiments of the invention may have impurity levels as set out in the following table:

| Compound | Concentration ± 10% |
|---|---|
| Al Aluminium | <10 ppm |
| As Arsenic | <0.2 ppm |
| Pb Lead | <0.2 ppm (200 ppb) |
| Fe Iron | <20 ppm |
| Hg Mercury | <0.02 ppm |
| Cr Chromium | <1.6 ppm |
| Ni Nickel | <3.7 ppm |
| Cu Copper | <0.3 ppm |
| Zn Zinc | <1 ppm |

Calcium carbonate produced in accordance with the invention has a number of advantages. For example, it has good values for both brightness, light scattering and gloss as well as low abrasivity which makes it particularly suitable for use in the paper coating and polymer industry, particularly in view of the very regular "rice grain" crystal morphology which leads to superior Theological effects. Additionally the purity of the product and the absence therefrom of large particles provide for very low abrasivity. Calcium carbonate produced in accordance with the invention also has a wide variety of applications beyond the paper coating and polymer industries. For example, its low level of impurities (particularly low level of lead) makes it suitable for food, pharmaceutical industries.

The brightness of the calcium carbonate is a good indication of its purity. Calcium carbonate produced in accordance with the invention will generally have a brightness R457 equal or superior to 96.0.

Sources of lime or lime hydroxides that may be used for producing calcium carbonate in accordance with the method of the invention include, for example, burnt lime produced by the calcination of limestone, carbide lime and other waste limes or lime hydroxides. Additional sources of calcium oxide or hydroxide may include Paper Sludge Ash, the product of incinerating paper sludge, in particular the sludge waste stream from the deinking of pulp recovered from recycled paper. The incineration of the paper sludge produces calcium oxide. The calcium oxide component provides the source of calcium ions dissolved in the polyhydroxide containing solution Step (i) of the method of the invention involves the production of a solution of calcium ions (derived from the starting lime or lime hydroxide) in a polyhydroxy compound which promotes the dissolution of the calcium. The final solution produced comprises 10% to 35% by weight of the dissolved polyhydroxy compound and 1% to 5% by weight of dissolved lime hydroxide (expressed as Ca(OH)$_2$). The solution has a pH of at least 11.5, but usually at least 12. If the starting material is lime (CaO) then it is generally preferred initially to produce a slurry of lime hydroxide ("slaked lime") and admix this slurry with a solution of the polyhydroxy compound so as to produce a final solution comprising 10% to 35% by weight of dissolved polyhydroxy compound and 1% to 5% by weight of dissolved lime hydroxide (expressed as Ca(OH)$_2$). If the starting material is a lime hydroxide then it may be admixed directly with the solution of the polyhydroxy compound.

As a general rule, the greater the amount of the dissolved polyhydroxy compound the greater is the amount of calcium ions that may be dissolved therein. Thus, for example, if the solution contains about 12% of the polyhydroxy compound then the amount of calcium hydroxide (expressed as Ca(OH)$_2$) that may be dissolved therein will be a maximum of about 2%. As a further example, a solution containing about 25% by weight of the polyhydroxy compound can contain a maximum of about 4% of dissolved calcium hydroxide.

Whilst the method of the invention is effective using amounts of 10% to 35% by weight of dissolved polyhydroxy compound and 1% to 5% by weight of dissolved calcium hydroxide, we particularly prefer that the amount of polyhydroxy compound is in the range 20% to 30% and the amount of dissolved calcium hydroxide is 2 to 4.5%. More particularly, we prefer that the amount of the polyhydroxy compound is in the range 23% to 27% and the amount of dissolved calcium hydroxide is in the range 3 to 4.0%. Particularly good results are obtained using about 25% by weight of dissolved polyhydroxy compound and about 3.4% to 3.9% by weight of the dissolved calcium hydroxide.

Examples of polyhydroxy compounds which may be employed for the method of the invention are as disclosed in WO-A-0034182 (Kemgas Ltd) and include compounds of the formula:

HOCH$_2$(CHOH)$_n$CH$_2$OH where n is 1 to 6. Thus for example the polyhydroxy compound may be glycerol (n=1). It is however more preferred that n is 2 to 6 and is particularly preferred that the polyhydroxy compound is a sugar alcohol (a "hydrogenated monosaccharide"). Examples of sugar alcohols include sorbitol, mannitol, xylitol, threitol and erythritol.

Also useful as polyhydroxy compounds that may be employed in the invention are those having a straight chain of n carbon atoms where n is 4 to 8 and (n-1) of the carbon atoms have a hydroxyl group bonded thereto. The other carbon atom (i.e. the one without the hydroxyl group) may have a saccharide residue bonded thereto. Such compounds are hydrogenated disaccharide alcohols and examples include maltitol and lactitol.

Particularly preferred for use in the invention are the hydrogenated monosaccharide (e.g. sorbitol) and disaccharide alcohols because of their thermal stability which can be important for subsequent processing of the calcium ion solution (see below).

Mixtures of the above described polyhydric alcohols may be used. Thus it is possible to use industrial sorbitol which, of the solids present, comprise about 80% sorbitol together with other polyhydroxy compounds such as mannitol and disaccharide alcohols. Examples of industrial sorbitol include Sorbidex NC 16205 from Cerestar and Meritol 160 from Syral.

Additionally however the polyhydroxy compound may be a saccharide (e.g. a mono- or di-saccharide).

The solution prepared for step (i) of the process is then treated in step (ii) to remove insoluble material including suspended solids which will contain metal impurities, this being one step which results in the purity of the calcium carbonate product obtained by the method of the invention. It is particularly preferred that suspended solids are removed by a flocculation step. The flocculating agent used may, for example, be a cationic polymer (such as Nalco 9908) which is added to the solution with mixing. Flocs and solids may be separated from the solution by conventional techniques. Thus, for example, the solution may be passed to a "settler" which allows the floes to be collected at, and discarded from, the bottom thereof. The solution may then be filtered through a sand column, or any other appropriate device, to remove remaining solid material.

The solution obtained from step (ii) is then subjected to a carbonation reaction (step iii) in which carbon dioxide either pure or diluted (if for instance a flue gas is used) is bubbled through the solution.

It is preferred that the reaction is effected in a batch reactor with a high shear gas dispersion agitator. However it is also possible to perform the reaction continuously either in a series of reactors with high shear agitators or in-line, adding the gas via ejectors in one or more steps. The amount of carbon dioxide added should be at least the stoichiometric amount required for conversion of all calcium ions in the solution to calcium carbonate.

The solution to be carbonated will typically be at a controlled temperature at the start of the carbonation reaction. Starting temperature will preferably be in a range of 10 to 40° C., and ideally in a range of 25 to 32° C.

During the course of a typical reaction, the pH (which is initially at least 11.5, more usually at least 12) progressively decreases. At a certain moment in the reaction there is a marked increase in the viscosity of the solution. We call this phase 2. Depending on the particular concentrations of polyhydroxy compound and calcium hydroxide in the starting solution this increase in viscosity may be caused by gel formation. Our studies have established that the progressive decrease in pH of the reaction mixture abruptly changes usually at a value of about 10.2-10.8 to a sudden sharp rise of typically 0.5 to 1 pH unit before continuing to decrease again.

The start of the short, sharp rise in pH denotes the end of phase 2 and during the period of the rise the calcium carbonate particles precipitate rapidly. As stated above, the amount of carbon dioxide to be added during the reaction should be at least the stoichiometric amount required for conversion of all calcium ions in the solution to carbon carbonate. Under the conditions described herein to make a 0.8 micron particle the quantity of carbon dioxide injected during phase 1 is between 70 and 85% of the total, with the remainder being injected in phase 2. Flow rates are generally as high as process conditions will allow. Those in phase 1 are generally much higher than in phase 2. Typically a reaction takes between 15 and 30 minutes.

An important feature of the invention is that once the pH of the product mixture begins to decrease after its short sharp rise it is not allowed to fall below 9.5, preferably not less than 10 and is ideally maintained at a value of at least 10.5.

We have established that this tight control of the pH of the product mixture (rather than simply allowing the pH to fall to lower values) is important in ensuring production of calcium carbonate of small uniform particle size and purity of the final calcium carbonate product. More particularly, we have found that some of the metal impurities present in the lime go into solution in step (i) of the method (e.g. by chelation with the polyhydroxy compound) and are therefore not removed in solids separation step (ii). By ensuring that the pH of the product mixture does not fall below 9.5, most of these metal impurities remain in solution and therefore do not contaminate the final precipitated calcium carbonate.

The arrest of the pH fall may be achieved by addition, to the product mixture, of an alkaline reagent. Most preferably the alkaline reagent is added to the product mixture as soon as practicably possible once the pH begins to fall after its short rise and in any event in time to ensure that the pH does not fall below 9.5. The alkaline agent should be one which does not lead to the introduction of impurities into the precipitated calcium carbonate product. For this reason, it is highly preferred to use as the alkaline agent a solution such as obtained from step (ii) as outlined above since the dissolved metal impurities contained therein do not precipitate to any substantial extent under the pH conditions prevailing in the product mixture. Typically the amount of this solution used will be 3 to 8% by volume of the product mixture so as to achieve the required arrest of the pH fall.

The solid calcium carbonate may be separated from the product mixture by any conventional separation technique. Thus, for example, a filter press may be used.

The liquor separated from the product mixture contains polyhydroxy compound which, ideally, is recycled for the purposes of producing a solution as required by step (i) of the method. This assists with the overall economics of the process. For this purpose, the separated liquor is purified and concentrated before being returned to step (i). Purification serves to remove impurities which might otherwise pollute calcium carbonate produced from the recycled solution of polyhydroxy compound. Purification is most conveniently effected by reducing the pH of the liquor to a value of 7 to 8 by addition of carbon dioxide. Subsequently the solution is subjected to evaporation to increase its concentration to a value appropriate for use in step (i) of the method. Evaporation should be effected under conditions that do not cause any significant decomposition of the polyhydroxy compound. Vacuum evaporation is preferred. After the evaporation step, the remaining solid contaminants are removed from the solution, for example by a second flocculation and a filtration or sedimentation step, as described above for step (ii), but not necessarily with both.

DESCRIPTION OF THE DRAWINGS

The invention will be further described with reference to the non-limiting Examples below and also the accompanying drawings, in which.

EXAMPLE 1

This Example describes the production of pure calcium carbonate comprised of discrete "rice grain" shape particles using lime obtained from calcined limestone from a quarry in the Czech Republic. The lime had impurity levels as set out in Table 1 in the Results section below.

Procedure

1. Slaking of the Quicklime

A slurry of slaked lime was produced by mixing the quicklime starting material with water to obtain a final consistency of 46% w/w for the slaked lime. At the end of the slaking reaction, the slurry had a temperature of about 85° C. The slurry was allowed to cool to ambient temperature before being used in the next step of the process, although this is not necessary.

2. Dissolution of the Slaked Lime 88 kg of the slaked lime (46% w/w) were mixed with 940 kg of a 26.4% by weight solution of sorbitol. The sorbitol solution was essentially free of impurities and mixing was effected at ambient temperature using a helical stirrer operating at 80 rpm.

The resulting solution contained 25% by weight of sorbitol and 3.46% by weight of slaked lime (expressed as $Ca(OH)_2$).

3. Flocculation/Settlement of the Slaked Lime Solution

A cationic polymer was added to the solution with mixing to flocculate contaminants present in the solution. 6 ppm of the Nalco product 9908 were added.

Cohesive flocs were then formed under controlled agitation for approx 20 minutes.

These flocs were then separated from the solution by passing through a plate settler.

Flocs containing the impurities were discarded from the bottom of the settler. An analysis of the composition of the flocs is shown in Table 1 in the Results section below.

The resulting solution from the settler was then filtered through a sand column yielding a very limpid solution.

4. Carbonation

Figure 1:
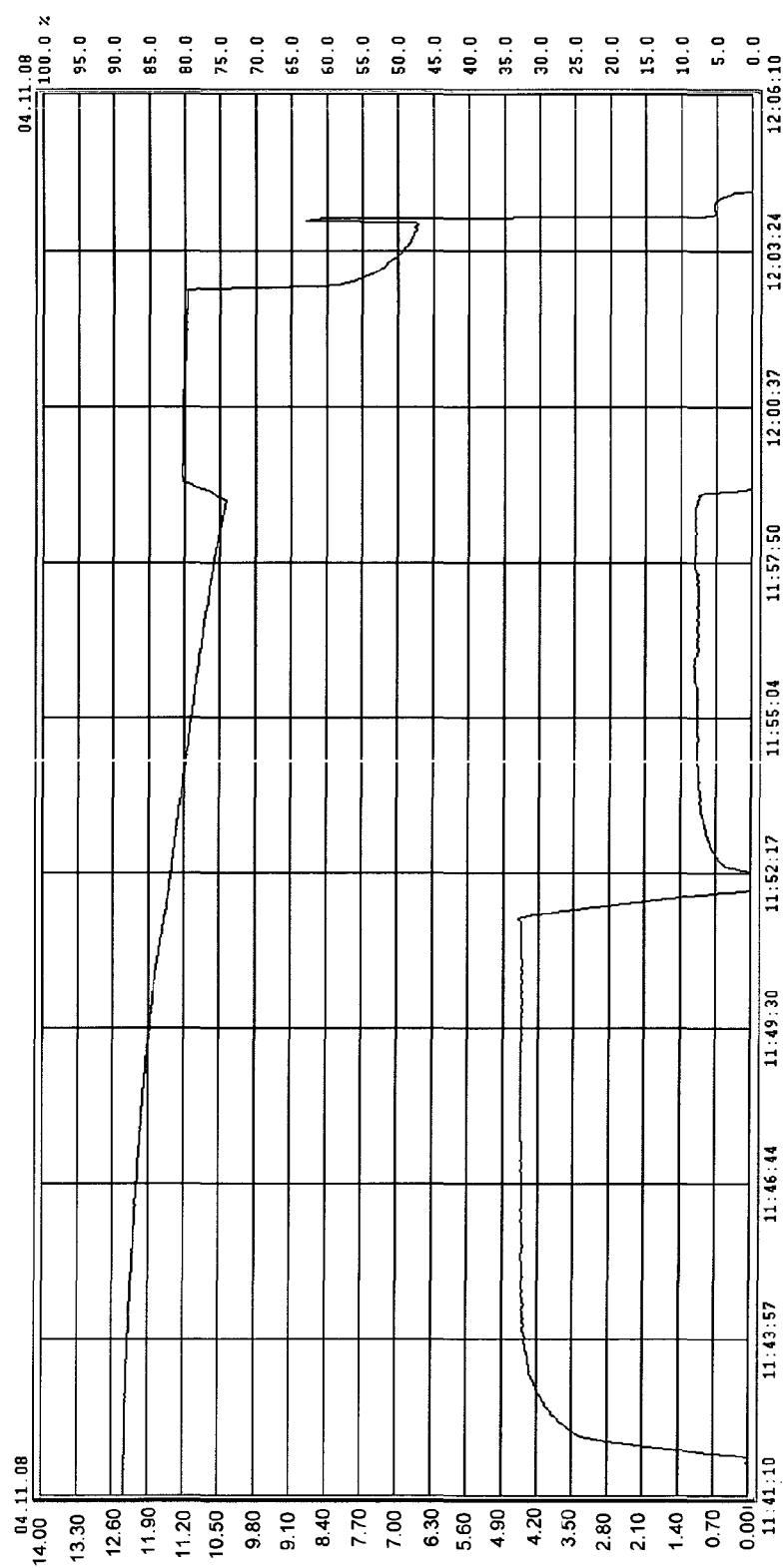
FIG. 1 is a plot of pH vs time for the procedure described in Example 1 below.
Figure 2:
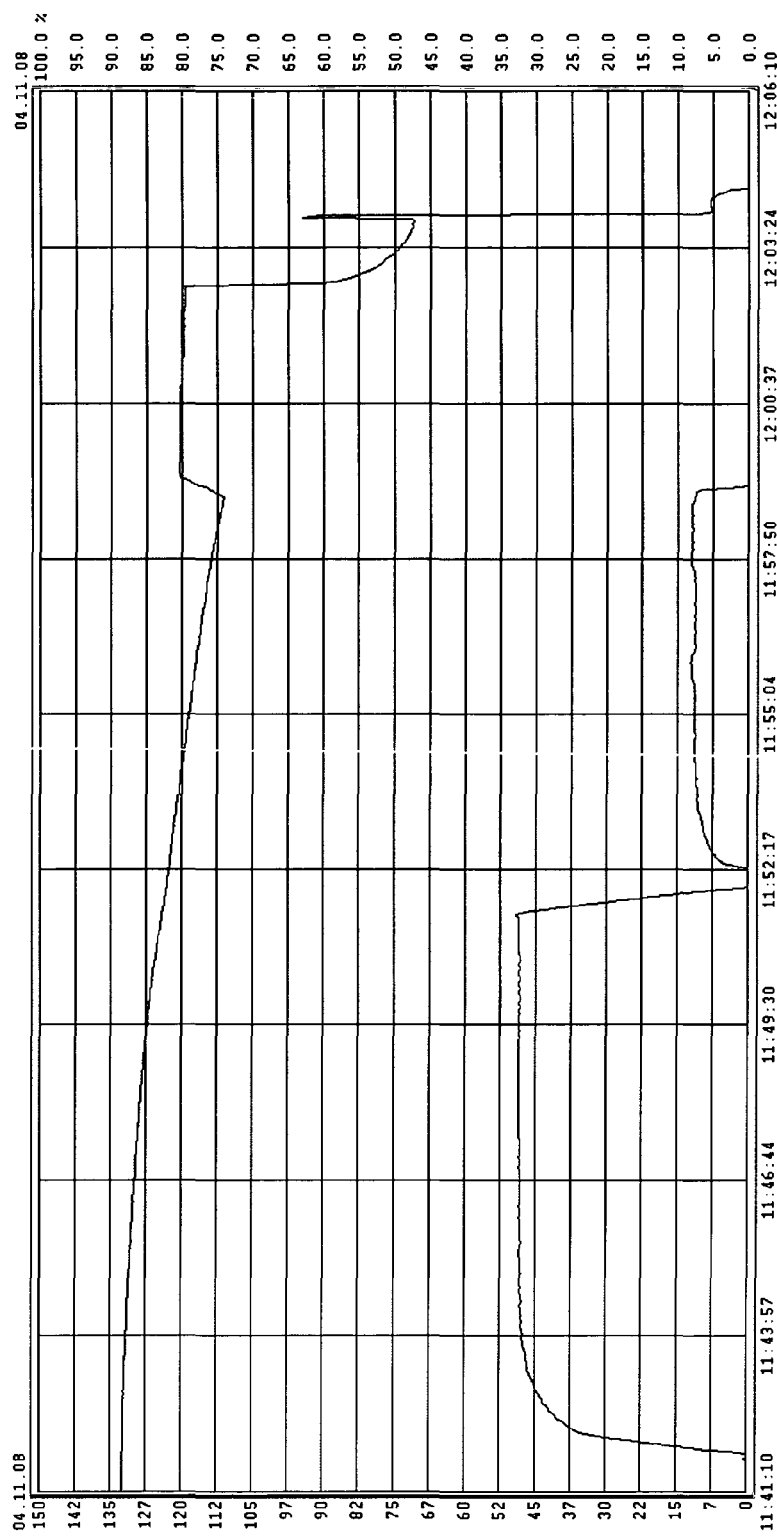
FIG. 2 is a plot of carbon dioxide dispersion rates vs time for the procedure of Example 1.

The limpid solution obtained from step (iii) was introduced to a 1.2 m³ reactor tank and approximately 20 kg of $CO_2$ were injected at a temperature of 23.1° C. into the bottom of the tank. It can be seen from FIG. 1 that there are three phases, namely:

(a) A first phase during which the reaction mixture was a liquid and the pure $CO_2$ was injected at a rate of 48.5 Nm³/hour during 10 minutes. (1 Nm³ is the quantity of a gas that occupies a volume of 1 cubic metre at a temperature of 0° C. and a pressure of 1.013 bar absolute). The $CO_2$ injection is shown in FIG. 2.) During this first phase, the pH fell steadily from 12.35 to about 11.55 (see FIG. 1). For convenience, the carbon dioxide dissolution curve shown in FIG. 2 is superimposed on to the pH curve of FIG. 1. Similarly, in FIG. 2, the pH curve of FIG. 1 has been superimposed on to the carbon dioxide dissolution rate curve.

(b) A second phase in which the reaction mixture was in the form of a gel and the pure $CO_2$ was injected at a rate of 11.5 Nm³/hour during 7 minutes. During this second phase, the pH continued to fall to a value of 10.4 (see FIG. 1).

(c) A third precipitation phase in which the calcium carbonate particles reached their final size. The suspension became white and a significant drop in viscosity occurred. As soon as the third phase started, the CO$_2$ injected was stopped. At the start of this phase the pH rose rapidly. To ensure that the pH does not then fall again, 40 kg of the solution obtained in step (3) above was added. The pH then remained steady at a value of about 11.2 (see FIG. 1).

5. Separation of Calcium Carbonate

The suspension obtained at the end of step (4) was concentrated using a filter press to a consistency of about 70-72%.

6. Recycling of Sorbitol Solution

The filtrate from the filter press (step (5)) had a concentration of 26% by weight of sorbitol. This solution was neutralised with CO$_2$ to a pH of 7 to 8 and then evaporated under vacuum at a temperature of about 65° C. to increase the sorbitol concentration to 29% by weight.

The resulting solution was suitable for recycling to step (2) of the process.

Results

Figure 3:
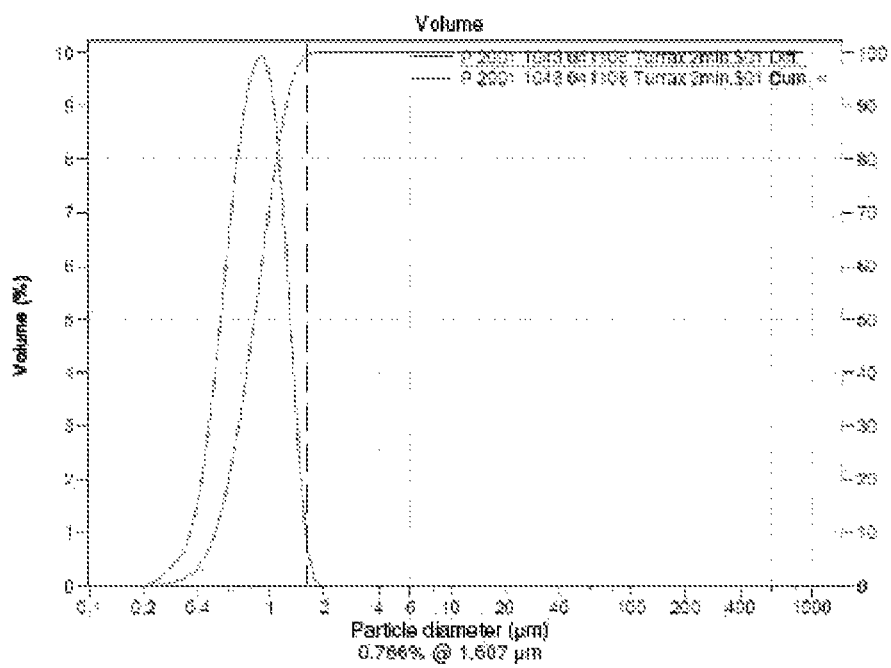
FIG. 3 shows the particle size distribution of the product obtained in accordance with Example 1.
Figure 4:
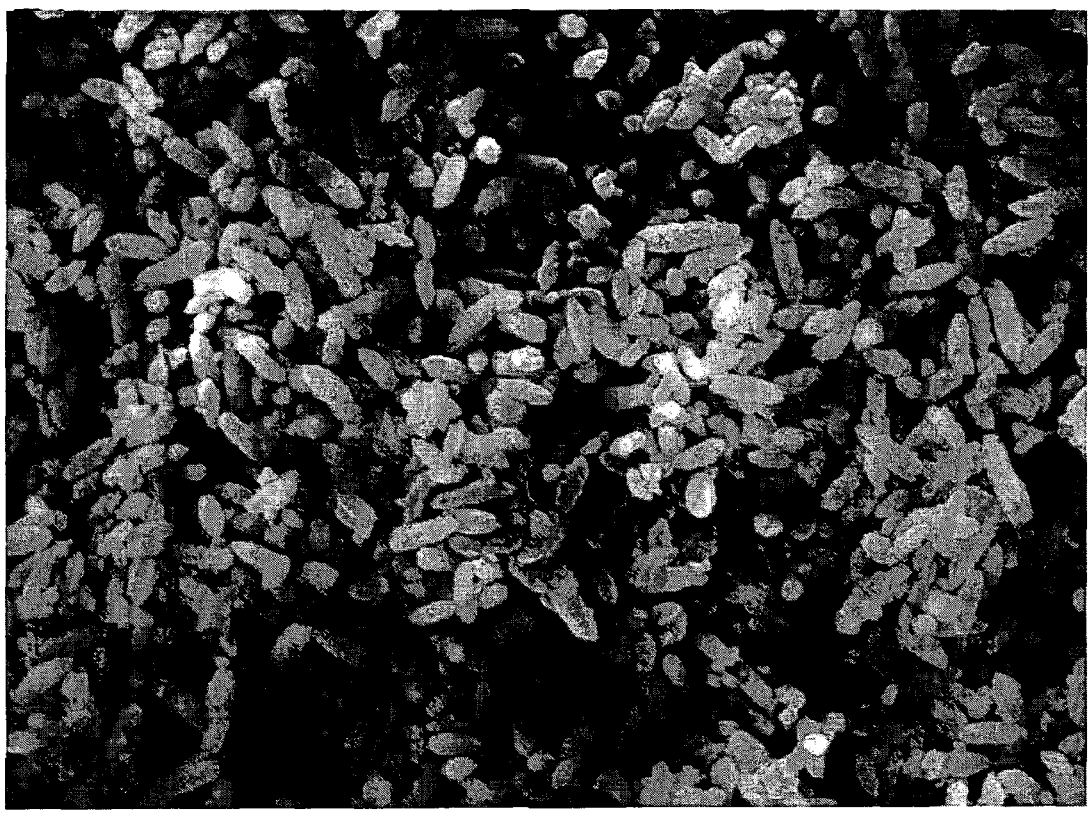
FIG. 4 is a photograph at 5000× magnification of the product obtained in accordance with Example 1.

The product obtained from step (4) had a particle size distribution as shown in FIG. 3. It will be seen that the particles had a mean size of 0.82 pm and a narrow size distribution, the di$_0$ and d$_{90}$ values being 0.50 pm and 1.23 pm respectively, or a d90/d10 ratio of 2.46. FIG. 4 is a photograph taken at a magnification of about 5000× of the product of step (4). It will be seen from FIG. 4 that the particles had the appearance of "rice grains".

The calcium carbonate produced had a R 457 brightness of 97.1.

Table 1 below shows impurity levels in the calcium carbonate product together with the levels in the initial lime material and also the flocs separated at the end of step (3) in which all amounts are in mg/kg.

TABLE 1

| Impurity | Initial Quicklime | Flocs from Step (3) | Final Product |
|---|---|---|---|
| Aluminium | 245 | 2590 | <20 |
| Arsenic | 0.63 | 3.9 | n/d |
| Cadmium | <2.0 | <10 | n/d |
| Chromium | <2.0 | <10 | n/d |
| Copper | <2.0 | <10 | <5 |
| Iron | 274 | 2690 | 18.6 |
| Lead | <2.0 | <10 | n/d |
| Magnesium | 349 | 43600 | 60 |
| Manganese | 0 | 303 | 4 |
| Mercury | 76 | <0.2 | n/d |
| Nickel | 67.7 | 14.9 | 5 |
| Sodium | 50.4 | 189 | 5.4 |
| Strontium | 35 | 742 | 26 |

In the above Table "n/d" indicates that the particular impurity was below detection limits and therefore "not detected".

EXAMPLE 2

This Example describes the production of calcium carbonate particles of a smaller size than those produced in Example 1.

The procedures described in Steps 1-3 of Example 1 were used to produce 773 kg of a solution containing 25% by weight of sorbitol and 3.9% by weight of slaked lime (expressed as Ca(OH)$_2$).

The solution was introduced into the reactor with a starting temperature of 22.5° C. During the first phase, CO$_2$ was injected at 44 Nm$^3$/hour for 9.3 minutes. During the second phase, CO$_2$ was injected at 9 Nm$^3$/hour for 8.3 minutes. The pH at the start of the reaction was 12.5. The pH decreased progressively to 10.5, at which point it suddenly rose to 11.2. As soon as the pH started to rise the C02 injection was stopped and 25 kg of the solution, identical to that introduced into the reactor at the start of the process, was added. This maintained the pH at 11.2.

The calcium carbonate so produced had a mean particle size of 0.5 microns. The particle size distribution as expressed by the ratio d90/d10 was 3.6. The calcium carbonate had a R 457 brightness of 96.9.

EXAMPLE 3

This Example describes the production of calcium carbonate particles of a larger size than those produced in Example 1.

The procedures described in Steps 1-3 of Example 1 were used to produce 606 kg of a solution containing 25% by weight of sorbitol and 1.8% by weight of slaked lime (expressed as Ca(OH)$_2$).

The solution was introduced into the reactor with a starting temperature of 17.0° C. During the first phase, CO$_2$ was injected at 34 Nm$_3$/hour for 7.6 minutes. During the second phase, CO$_2$ was injected at 10.9 Nm$^3$/hour for 0.7 minutes. The pH at the start of the reaction was 13.0. The pH decreased progressively to 10.1 at which point it suddenly rose to 11.2. As soon as the pH started to rise the C02 injection was stopped and 25 kg of the solution, identical to that introduced into the reactor at the start of the process, was added. This maintained the pH above 11.2.

The calcium carbonate particles so produced had a mean particle size of 1.42 microns. The particle size distribution as expressed by the ratio d90/d 0 was 3.25. The calcium carbonate had a R 457 brightness of 96.2.

EXAMPLE 4

This Example demonstrates the effect of pH on purity of the product.

A laboratory experiment was carried out on a 2000 gram solution containing 25% by weight of sorbitol and 3.4% by weight of slaked lime. The solution was split into two equal batches. Each batch was placed in a small 3 litre reactor and CO$_2$ was injected into the solution, at 96 litres/hour in Phase 1 and at 25.5 litres/hour in Phase 2. The starting pH was 12.7 for both batches. C02 injection was stopped for both batches when the sudden rise in pH occurred.

The reaction characteristics of each batch and processing details therefore are described below.

Batch 1: the sudden short rise in pH occurred at a pH of 10.9. 11 grams of the starting solution was immediately added and this maintained the pH above 11.2.

Batch 2: The sudden short rise in pH occurred at 11.1. After rising to 11.5 the pH then fell rapidly to 7.4. No solution was added and the pH continued to fall to 7.0 during the next 15 minutes.

Calcium carbonate produced in each of the two batches was analysed for R 457 brightness and iron content. The results are shown in the following Table.

| Batch No. | R458 Brightness | Iron Content |
|---|---|---|
| 1 | 97.7 | 15 ppm |
| 2 | 95.3 | 200 ppm |

It can be seen from the above Table that control of pH in accordance with the invention (Batch 1) resulted in a pure product of low iron content, as reflected by the R457 brightness value (97.7). In contrast, Batch 2 (which was effected without pH control) gave a product having an iron content of 200 ppm and a R457 brightness value of 95.3.

The invention claimed is:

1. A method of producing calcium carbonate from lime comprising the steps of:
   (i) providing an aqueous solution comprising 10% to 35% by weight of dissolved polyhydroxy compound and 1% to 5% by weight of dissolved calcium hydroxide (expressed as $Ca(OH)_2$) and having a pH of at least 11.5;
   (ii) treating the solution prepared in step (i) to remove solids including suspended solids;
   (iii) dispersing carbon dioxide through the solution of step (ii) so as to form a mixture containing calcium carbonate, said dispersing initially producing a reduction in the pH of the mixture, and subsequently producing a rise in the pH of the mixture;
   (iv) terminating the dispersion of carbon dioxide and adding an alkaline agent at a time after the beginning of the rise in the pH of the reaction mixture in step (iii) but before any subsequent reduction in the pH of the reaction mixture to 9.5, the alkaline agent being added to maintain a pH for the mixture of at least 9.5, and
   (v) recovering precipitated calcium carbonate.

2. A method as claimed in claim 1 wherein in step (i) said aqueous solution comprises 20% to 30% by weight of dissolved polyhydroxy compound and 2 to 4.5% by weight of dissolved calcium hydroxide (expressed as $Ca(OH)_2$).

3. A method as claimed in claim 2 wherein in step (i) said aqueous solution comprises 23% to 27% by weight of dissolved polyhydroxy compound and 3% to 4% by weight of dissolved calcium hydroxide (expressed as $Ca(OH)_2$).

4. A method as claimed in claim 3 wherein in step (i) said aqueous solution comprises about 25% by weight of dissolved polyhydroxy compound and 3.4% to 3.9% by weight of dissolved calcium hydroxide (expressed as $Ca(OH)_2$).

5. A method as claimed in claim 1 wherein in step (iii) of the method the amount of carbon dioxide dispersed through the solution is at least the stoichiometric amount required to convert the dissolved calcium to calcium carbonate.

6. A method as claimed in claim 5 wherein during step (iii) there is a transition from a first reaction phase to a second reaction phase marked by a decrease in the rate at which the reaction mixture is able to absorb carbon dioxide and wherein 70% to 85% by weight of the total amount of the stoichiometric amount of carbon dioxide is dispersed in the first reaction phase and the remainder is dispersed in the second reaction phase.

7. A method as claimed in claim 5 wherein during step (iii) there is a transition from a first reaction phase to a second reaction phase marked by formation of a gel and wherein 70% to 85% by weight of the total amount of the stoichiometric amount of carbon dioxide is dispersed in the first reaction phase and the remainder is dispersed in the second reaction phase.

8. A method as claimed in claim 6 wherein in the first reaction phase the carbon dioxide is dispersed at the maximum rate at which it can be absorbed by the reaction mixture.

9. A method as claimed in claim 8 wherein in the second reaction phase the carbon dioxide is dispersed at the maximum rate at which it can be absorbed by the reaction mixture, said dispersion rate in the second reaction phase being less than in the first reaction phase.

10. A method as claimed in claim 1 wherein in step (iv) the rise in pH begins at a pH value of 10.2 to 10.8.

11. A method as claimed in any one of claim 1 wherein in step (iv) dispersion of carbon dioxide is terminated prior to addition of the alkaline agent.

12. A method as claimed in claim 1 wherein, in step (iv) the alkaline agent provides a pH for the product mixture of at least 10.

13. A method as claimed in claim 12 wherein, in step (iv) the alkaline agent provides a pH for the product mixture of at least 10.5.

14. A method as claimed in claim 1 wherein the polyhydroxy compound is of the formula:

$$HOCH_2(CHOH)_nCH_2OH$$

wherein is n is 1 to 6.

15. A method as claimed in claim 14 wherein the polyhydroxy compound is sorbitol.

16. A method as claimed in claim 1 wherein the lime is produced by calcination of limestone.

17. A method as claimed in claim 1 wherein the lime is carbide lime.

18. A method as claimed in claim 1 wherein the lime is Paper Sludge Ash.

19. A method as claimed in claim 1 wherein the alkaline agent is prepared in accordance with the procedure of steps (i) and (ii) as defined above.

20. A method as claimed in claim 1 wherein a solution of polyhydroxy compound is separated from the calcium carbonate in step (v) and is treated with carbon dioxide to reduce its pH to a value of less than 8, and the treated solution is recycled to step (i) of the method.

21. A method as claimed in claim 20 wherein the treatment of the solution of the polyhydroxy compound with carbon dioxide is effected to provide a pH of 7-8 for the solution of the polyhydroxy compound.

22. A method as claimed in claim 20 wherein the solution of the polyhydroxy compound is additionally concentrated by evaporation prior to recycling to step (i) of the method.

23. A method as claimed in claim 7 wherein in the first reaction phase the carbon dioxide is dispersed at a maximum rate at which it can be absorbed by the reaction mixture.

24. A method as claimed in claim 23 wherein in the second reaction phase the carbon dioxide is dispersed at a maximum rate at which it can be absorbed by the reaction mixture, said dispersion rate in the second reaction phase being less than in the first reaction phase.

* * * * *